(12) United States Patent
Iida

(10) Patent No.: US 6,662,934 B1
(45) Date of Patent: Dec. 16, 2003

(54) TRANSFER APPARATUS

(75) Inventor: Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 269 days.

(21) Appl. No.: 09/685,960

(22) Filed: Oct. 16, 2000

(30) Foreign Application Priority Data

Oct. 18, 1999 (JP) .......................................... 11-296000

(51) Int. Cl.[7] .............................................. B65G 25/04
(52) U.S. Cl. ................................ 198/750.1; 198/750.7; 198/621.1
(58) Field of Search ............................ 198/621.1, 750.1

(56) References Cited

U.S. PATENT DOCUMENTS 5,279,207 A  1/1994  Takada et al. ................. 92/5 R

FOREIGN PATENT DOCUMENTS

| DE | 695 21 390 | 7/2002 |
|---|---|---|
| EP | 0 711 928 | 5/1996 |
| JP | 2613337 | 2/1997 |
| JP | 09-144711 | 6/1997 |
| JP | 2838067 | 10/1998 |

*Primary Examiner*—Christopher P. Ellis
*Assistant Examiner*—Rashmi Sharma
(74) *Attorney, Agent, or Firm*—Paul A. Guss

(57) ABSTRACT

A rodless cylinder comprises a cylinder tube, and a slide table which is movable back and forth along the cylinder tube. A cover member is fixed to the cylinder tube in a state in which an attachment base is secured to the slide table. A dust-preventive member is integrally interposed by an inner wall of the cover member, a side wall of the cylinder tube, and a side wall of the attachment base. The dust-preventive member is provided to be capable of making elastic deformation in a direction of the arrow B perpendicular to a direction of the arrow A.

20 Claims, 16 Drawing Sheets

TRANSFER APPARATUS

BACKGROUND OF THE INVENTION

1. Field of the Invention

The present invention relates to a transfer apparatus which holds a workpiece and which automatically transfers the workpiece in accordance with the action of an actuator.

2. Description of the Related Art

Usually, a variety of transfer apparatuses are used in a factory or the like in order to automatically transport a workpiece, for example, to respective working stations. For example, a rodless cylinder is widely adopted as such a transfer apparatus, because of the following reason. That is, in the case of the rodless cylinder, the entire length with respect to the stroke length can be shortened as compared with a cylinder having a rod. Accordingly, the rodless cylinder is advantageous in that the occupying area is decreased, and the handling performance is excellent.

For example, as disclosed in Japanese Patent No. 2613337, such a rodless cylinder is provided with a cylinder and a slide table. The cylinder includes a cylinder tube and a piston which makes reciprocating movement in a bore formed in the cylinder tube. A slit, which extends in the longitudinal direction to make communication between the outside and the bore, is formed for the cylinder tube. The slit is closed by a first seal member which is engaged with the piston and a second seal member which is engaged with the slide table.

The transfer apparatus is used, in many cases, in an environment in which large amounts of coarse particulate, cutting powder, paper powder, coolant, mist and the like exist in a mixed manner. When the rodless cylinder is used as the transfer apparatus, it is feared that the dust or the like makes invasion through the gap of the slit to deteriorate the operability of the cylinder. For this reason, for example, as disclosed in Japanese Laid-Open Patent Publication No. 9-144711 (hereinafter referred to as "Conventional technique 1"), a rodless cylinder is known, comprising a cylinder tube, a piston which is accommodated movably in the cylinder tube, a slit which extends in the longitudinal direction of the tube and which makes communication between the inside and the outside of the tube, a slider which is arranged at the outside of the cylinder tube and which is connected to the piston via the slit, and a dust-preventive cover which covers the portion of formation of the slit and which makes expansion and contraction in the longitudinal direction of the tube in accordance with the movement of the slider.

Further, as disclosed in Japanese Patent No. 2838067 (hereinafter referred to as "Conventional technique 2"), a rodless cylinder is known, comprising a cylinder tube, a piston which is accommodated movably in the cylinder tube, a slit which extends in the longitudinal direction of the tube and which makes communication between the inside and the outside of the tube, and a slide table which is arranged at the outside of the cylinder tube and which is connected to the piston via the slit, wherein a dust-preventive cover, which covers at least a slit-forming plane of the cylinder tube, is inserted into a cover insertion hole formed for the slide table, and the slide table is allowed to make reciprocating movement along the dust-preventive cover.

However, Conventional technique 1 described above includes the dust-preventive cover which makes expansion and contraction in the longitudinal direction of the tube in accordance with the movement of the piston and the slider. Therefore, the entire size of the rodless cylinder in the longitudinal direction is lengthened in an amount corresponding to the size in a state in which the dust-preventive cover is contracted. For this reason, it is not possible to shorten the size of the rodless cylinder. In the case of Conventional technique 2 described above, the gap is generated between the dust-preventive cover and the cover insertion hole of the slide table. For this reason, a problem is pointed out such that the dust or the like tends to make invasion with ease through the gap in accordance with the movement of the slide table.

SUMMARY OF THE INVENTION

A general object of the present invention is to provide a transfer apparatus which makes it possible to effectively shorten the size in the transfer direction and achieve the excellent dust-preventive function with a simple structure.

A principal object of the present invention is to provide a transfer apparatus which makes it possible to reliably avoid any invasion of the dust or the like through the gap between a main apparatus body and a movable member via a dust-preventive member.

Another object of the present invention is to provide a transfer apparatus which makes it possible to reliably remove the dust or the like even when the dust or the like is accumulated on a dust-preventive member, by providing a scraper corresponding to a bellows-shaped configuration of the dust-preventive member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
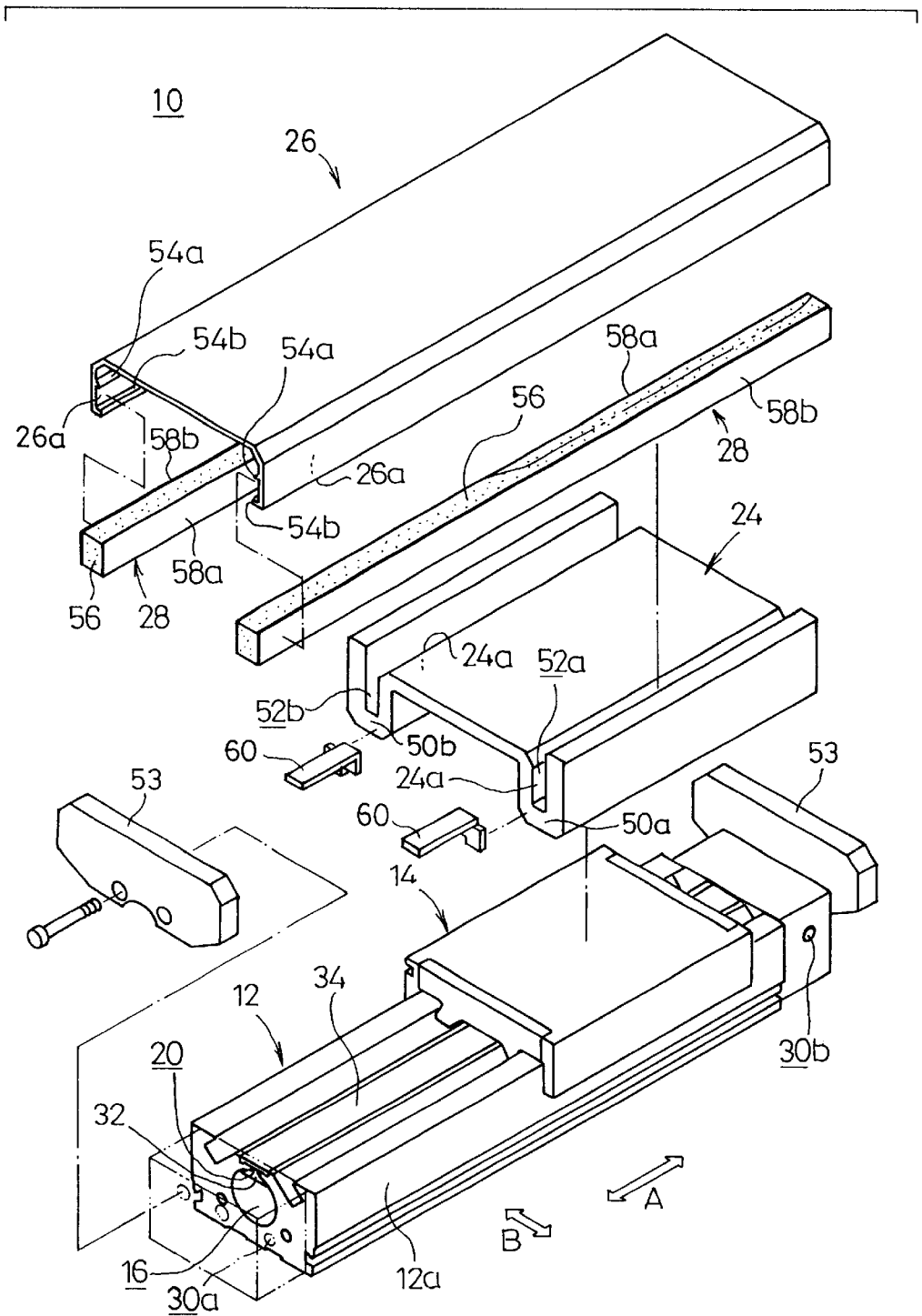
FIG. 1 shows an exploded perspective view illustrating a rodless cylinder according to a first embodiment of the present invention.

FIG. 1 shows a rodless cylinder 10 according to a first embodiment of the present invention. The rodless cylinder 10 comprises a cylinder tube (main apparatus body) 12 which is designed to be lengthy in the transfer direction (direction of the arrow A) for an unillustrated workpiece and which constitutes an actuator, a slide table 14 which is a movable member, a piston 18 which makes reciprocating movement in a bore 16 formed to extend in the direction of the arrow A in the cylinder tube 12 (see FIGS. 3 and 4), a transmitting section 22 which connects the piston 18 and the slide table 14 via a slit 20 formed for the cylinder tube 12 to extend in the direction of the arrow A (see FIGS. 3 and 4), a cover member 26 which is installed to the cylinder tube 12 to extend in the longitudinal direction (direction of the arrow A) while covering the slide table 14 and an attachment base 24 fixed to the slide table 14, and dust-preventive members 28 each of which is integrally interposed by an inner wall 26a of the cover member 26, a side wall 12a of the cylinder tube 12, and a side wall 24a of the attachment base 24. The rodless cylinder may be constructed such that the workpiece (not shown) is directly installed to the slide table 14 without using the attachment base 24.

Figure 3:
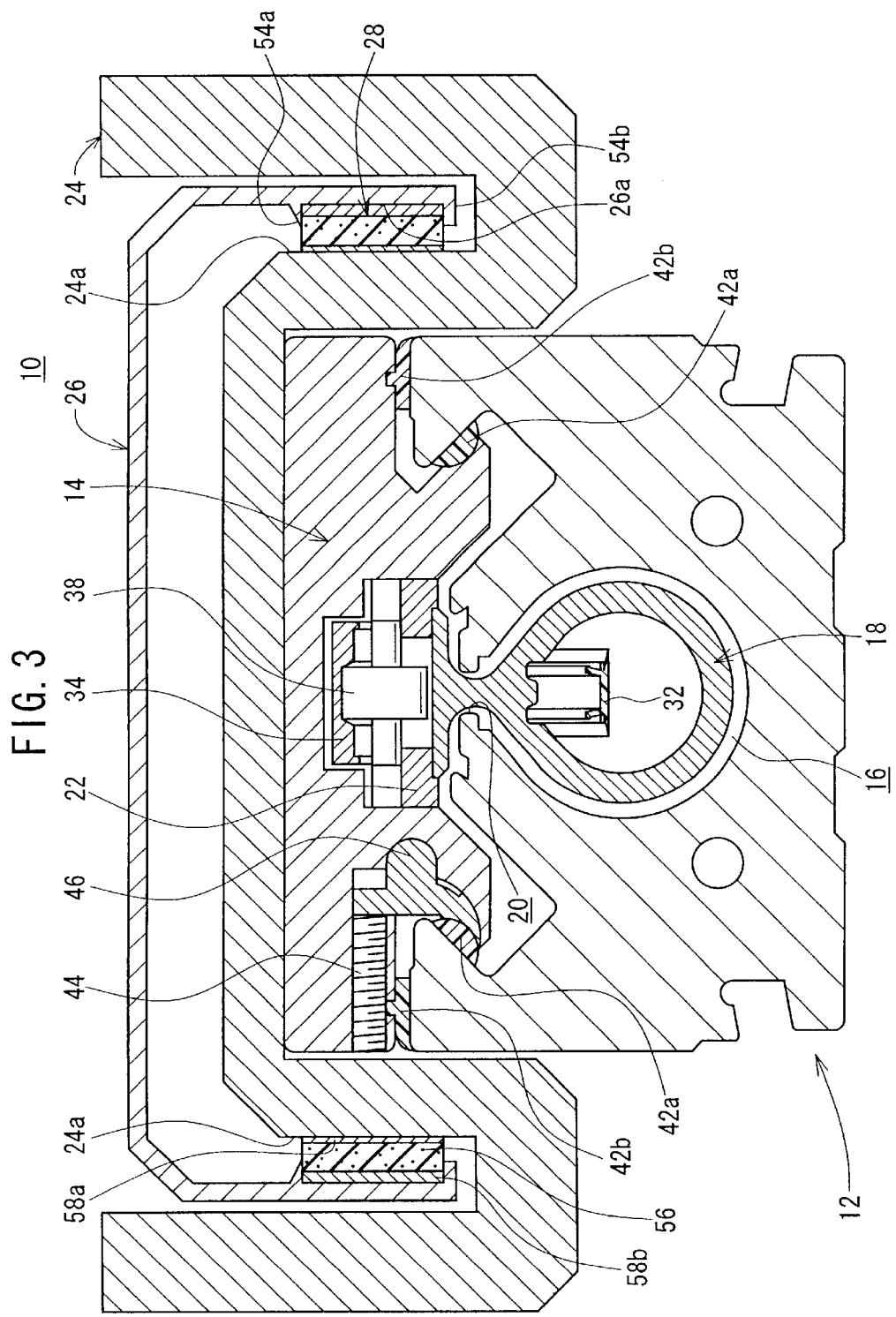
FIG. 3 shows a vertical sectional view illustrating the rodless cylinder including a slide table.
Figure 4:
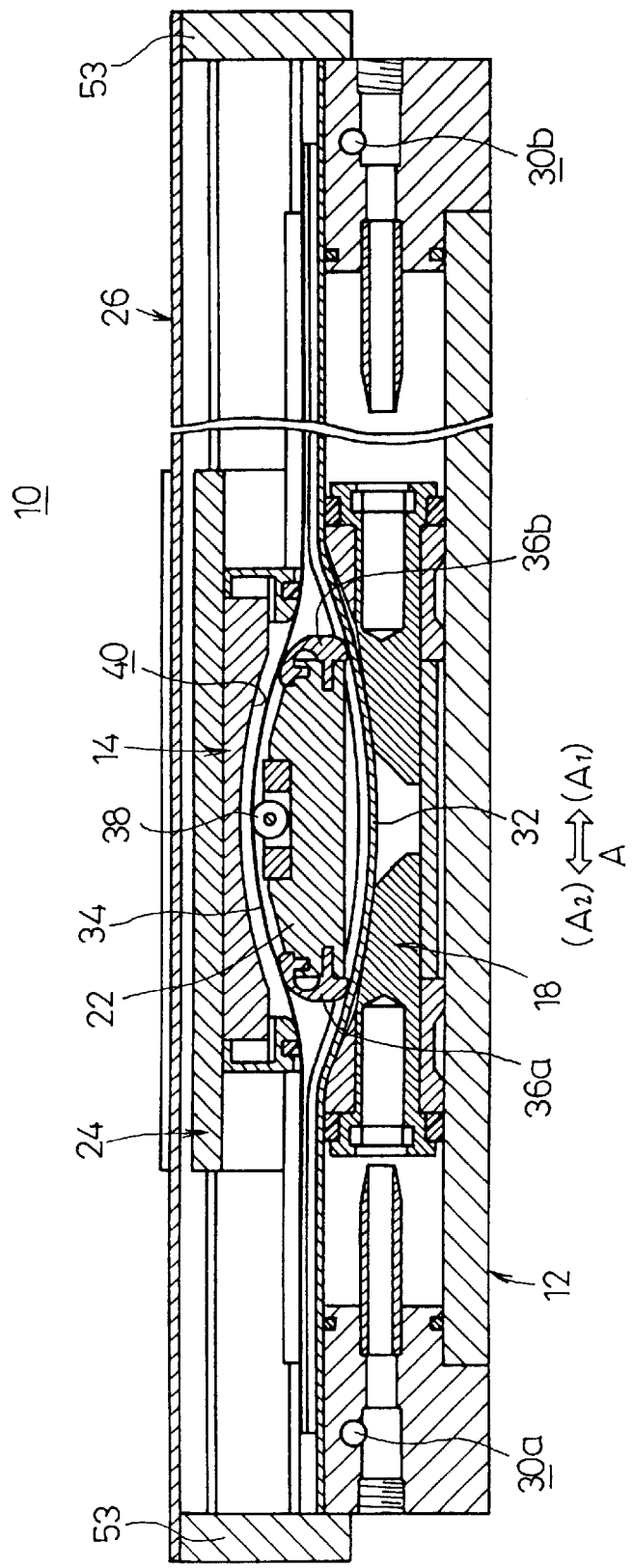
FIG. 4 shows a longitudinal sectional view taken along the longitudinal direction of the rodless cylinder.

As shown in FIGS. 1 and 4, ports 30a, 30b for supplying and discharging a fluid is formed on both end sides of the cylinder tube 12 in order to reciprocate the piston 18 arranged in the bore 16 in the direction of the arrow A. As shown in FIGS. 3 and 4, a first seal member 32 and a second seal member 34 are secured to the cylinder tube 12 with the slit 20 intervening therebetween. The piston 18 is provided with belt separators 36a, 36b for vertically separating the first and second seal members 32, 34 from each other. The transmitting section 22 is provided to protrude upwardly from the slit 20 of the cylinder tube 12. The transmitting section 22 is provided with a roller 38. A space 40 for fitting the transmitting section 22 is provided for the slide table 14. The slide table 14 is held by the piston 18 by the aid of the transmitting section 22.

As shown in FIG. 3, bearings 42a, 42b made of synthetic resin, which extend in the longitudinal direction, are secured to the cylinder tube 12. On the other hand, the slide table 14 is provided with an adjust arm 46 which is swingable by the aid of an adjustment screw 44. The cylinder tube 12 and the slide table 14 are basically constructed as described above. However, detailed arrangements of them are similar to those of a rodless cylinder disclosed in Japanese Patent No. 2613337 of the present applicant.

Figure 2:
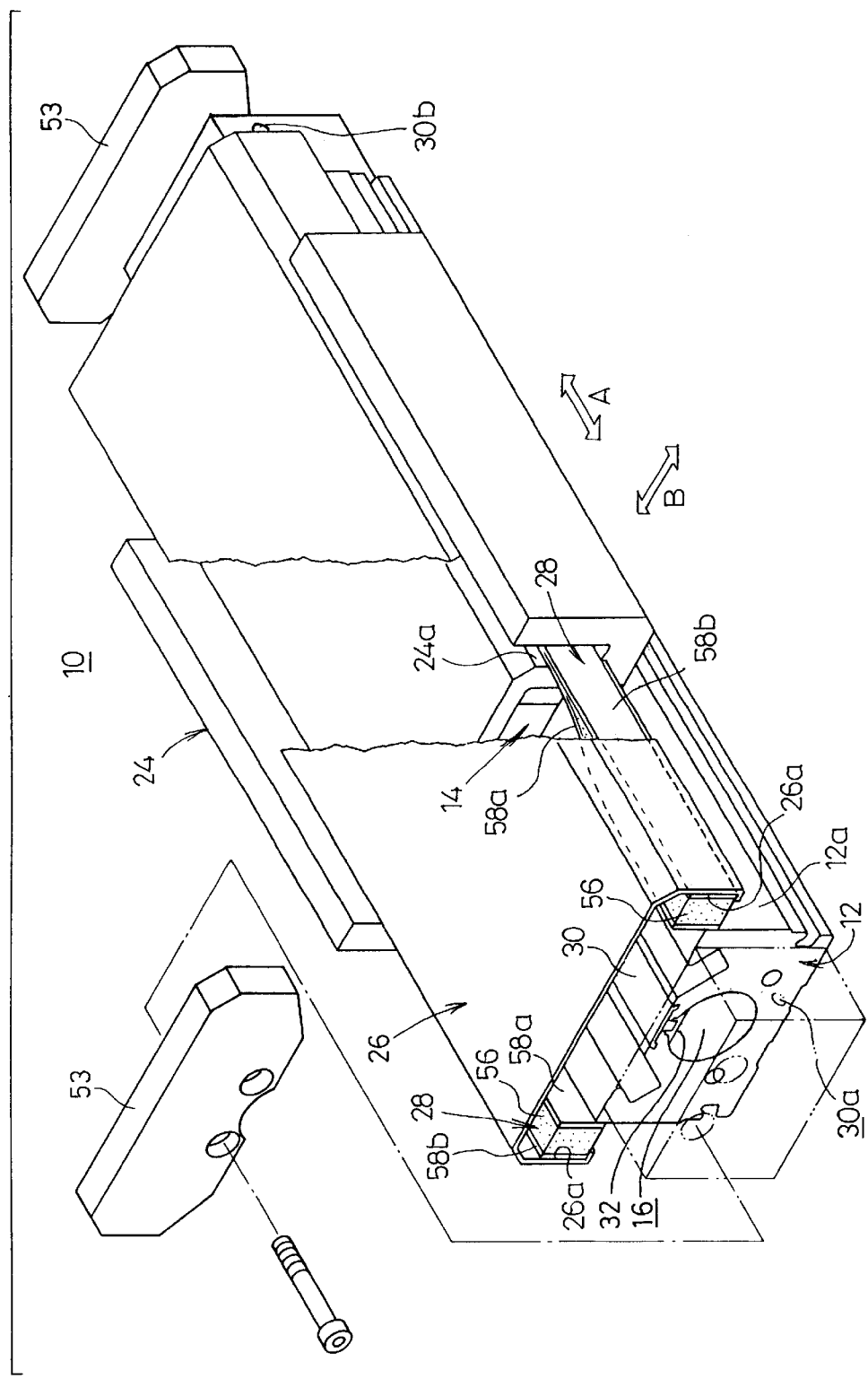
FIG. 2 shows, with partial cutout, a perspective view illustrating the rodless cylinder shown in FIG. 1.

As shown in FIGS. 1 and 2, the attachment base 24, which is secured to the slide table 14, is provided with bent sections 50a, 50b in an integrated manner. Spaces 52a, 52b, which are open upwardly, are formed in the direction of the arrow A for the bent sections 50a, 50b. Both ends of the cover member 26 in the longitudinal direction are secured to a pair of end plates 53 fixed to the cylinder tube 12 in a state in which the attachment base 24 is secured to the slide table 14 (see FIGS. 1, 2, and 4).

The cover member 26 is constructed by bending both ends of a plate member which is lengthy in the direction of the arrow A. A pair of projections 54a, 54b, which extend in the direction of the arrow A, are provided on inner walls 26a at both ends of the cover member 26 corresponding to the height dimension of the dust-preventive member 28. The both ends of the cover member 26 are arranged in the spaces 52a, 52b of the attachment base 24. The dust-preventive member 28 is integrally interposed by the inner wall 26a of the cover member 26, the side wall 12a of the cylinder tube 12, and the side wall 24a of the attachment base 24 (substantially equivalent to the side wall of the slide table 14).

The dust-preventive member 28 includes a prism-shaped sponge rubber 56 and plate members 58a, 58b made of stainless steel secured to both sides of the sponge rubber 56. The plate member 58a constitutes a sliding member which makes sliding contact with the side wall 24a of the attachment base 24. The dust-preventive member 28 is secured, for example, to the inner wall 26a of the cover member 26. The dust-preventive member 28 is capable of making elastic deformation in the direction of the arrow B perpendicular to (intersecting with) the direction of the arrow A when the attachment base 24 makes sliding contact.

Closing members 60 (see FIG. 1), which close gaps (not shown) formed in the vicinity of the attachment base 24 when the dust-preventive member 28 makes elastic deformation, are secured to both ends of the attachment base 24 in the movement direction.

Explanation will now be made for the operation of the rodless cylinder 10 according to the first embodiment constructed as described above.

At first, for example, when the compressed air is introduced into the cylinder tube 12 from the port 30a after the unillustrated workpiece is installed to the attachment base 24, the compressed air presses the piston 18. Accordingly, the piston 18 is moved in the direction of the arrow A1 as shown in FIG. 4 integrally with the slide table 14 and the attachment base 24 via the space 40 to which the transmitting section 22 is fitted. On the other hand, when the compressed air is introduced into the port 30b, the piston 18 is moved in the direction of the arrow A2 integrally with the slide table 14 and the attachment base 24. Therefore, the operation for transferring the unillustrated workpiece is automatically performed.

In this arrangement, in the first embodiment, the dust-preventive member 28 is integrally interposed by the inner wall 26a of the cover member 26, the side wall 12a of the cylinder tube 12, and the side wall 24a of the attachment base 24. The sponge rubber 56, which constitutes the dust-preventive member 28, is capable of making elastic deformation in the direction of the arrow B intersecting with the transfer direction (direction of the arrow A) for the workpiece (see two-dot chain line shown in FIG. 1).

Accordingly, the dust-preventive member 28 does not affect the movement (stroke) of the slide table 14 in the direction of the arrow A. It is possible to avoid the lengthy size of the entire length of the rodless cylinder 10, and it is possible to effectively miniaturize the rodless cylinder 10.

Further, the dust-preventive member 28 is arranged in the longitudinal direction of the cylinder tube 12 (direction of the arrow A). It is possible to reliably close the entire rodless cylinder 10. An effect is obtained such that the dust-preventive function is greatly improved with the simple structure. Therefore, the rodless cylinder 10 can be effectively used for the operation for transferring the workpiece even in the environment in which large amounts of coarse particulate, coolant, mist and the like are especially generated.

The dust-preventive member 28 is provided with the sponge rubber 56 and the plate members 58a, 58b made of stainless steel. Accordingly, especially when the dust-preventive member 28 makes sliding contact with the side wall 24a of the attachment base 24 which is moved integrally with the slide table 14, and the dust-preventive member 28 is deformed, then the plate member 58a makes sliding contact with the side wall 24a. Thus, the durability of the dust-preventive member 28 itself is effectively improved.

Figure 5:
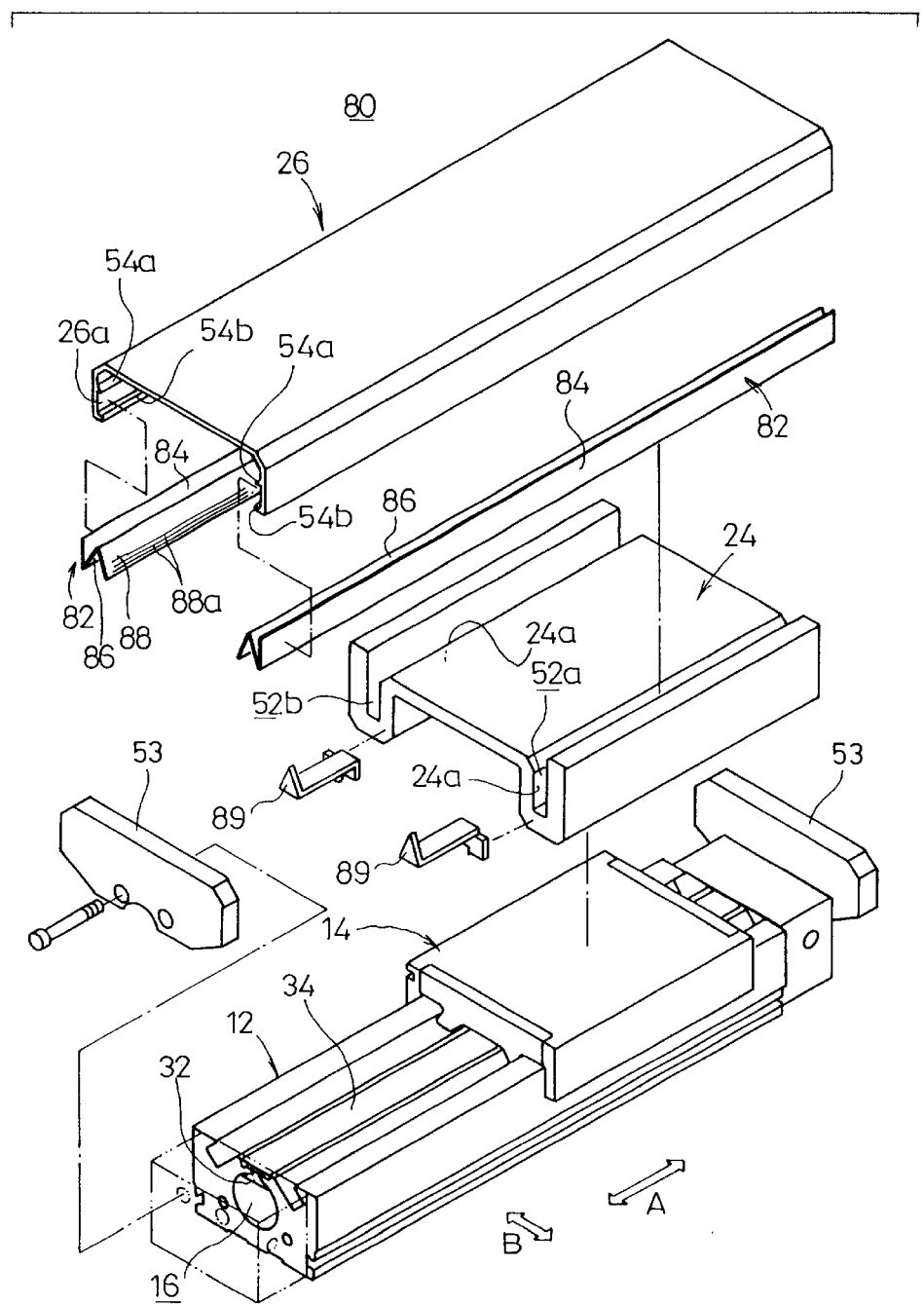
FIG. 5 shows an exploded perspective view illustrating a rodless cylinder according to a second embodiment of the present invention.
Figure 6:
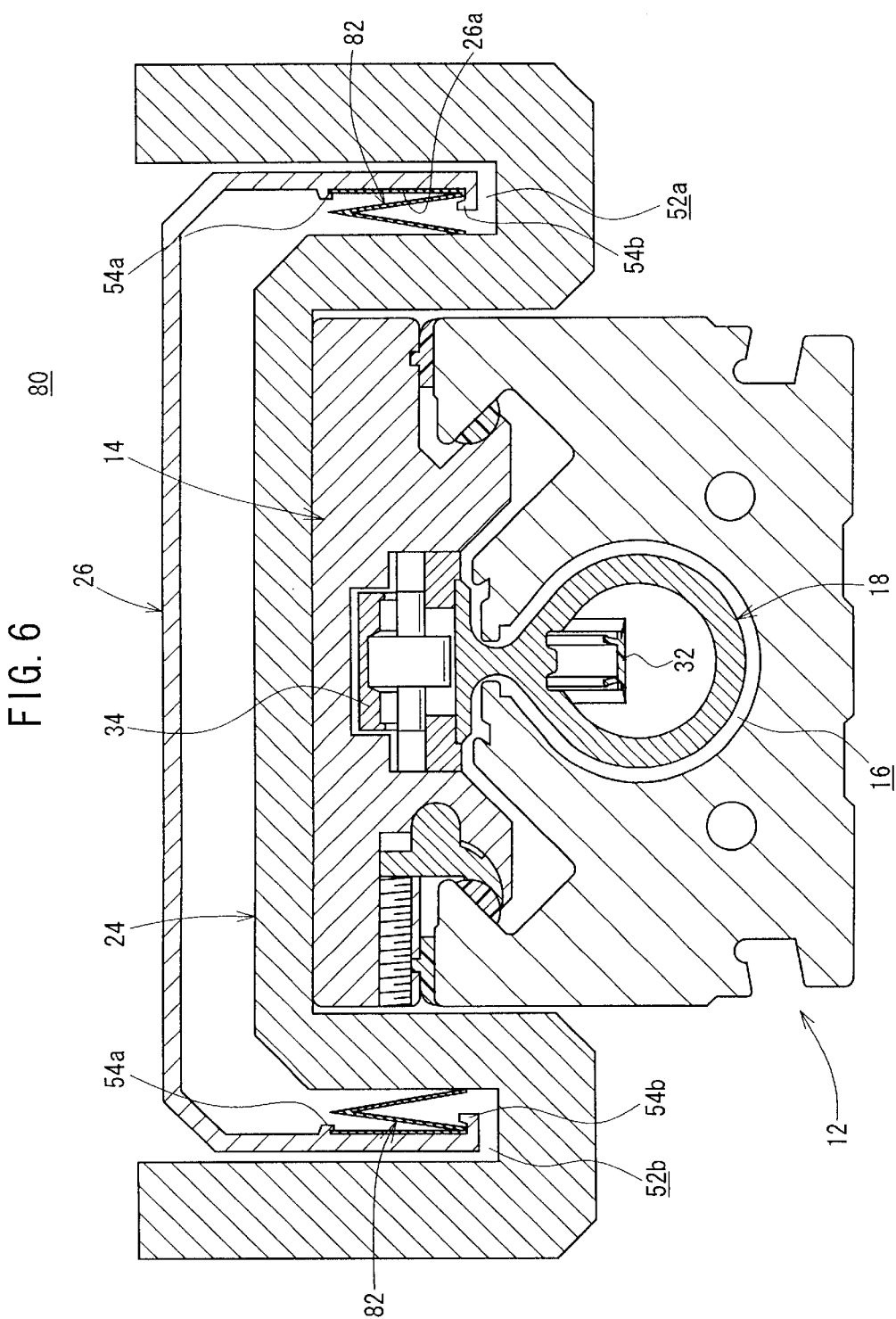
FIG. 6 shows a vertical sectional view illustrating the rodless cylinder shown in FIG. 5 including a slide table.
Figure 7:
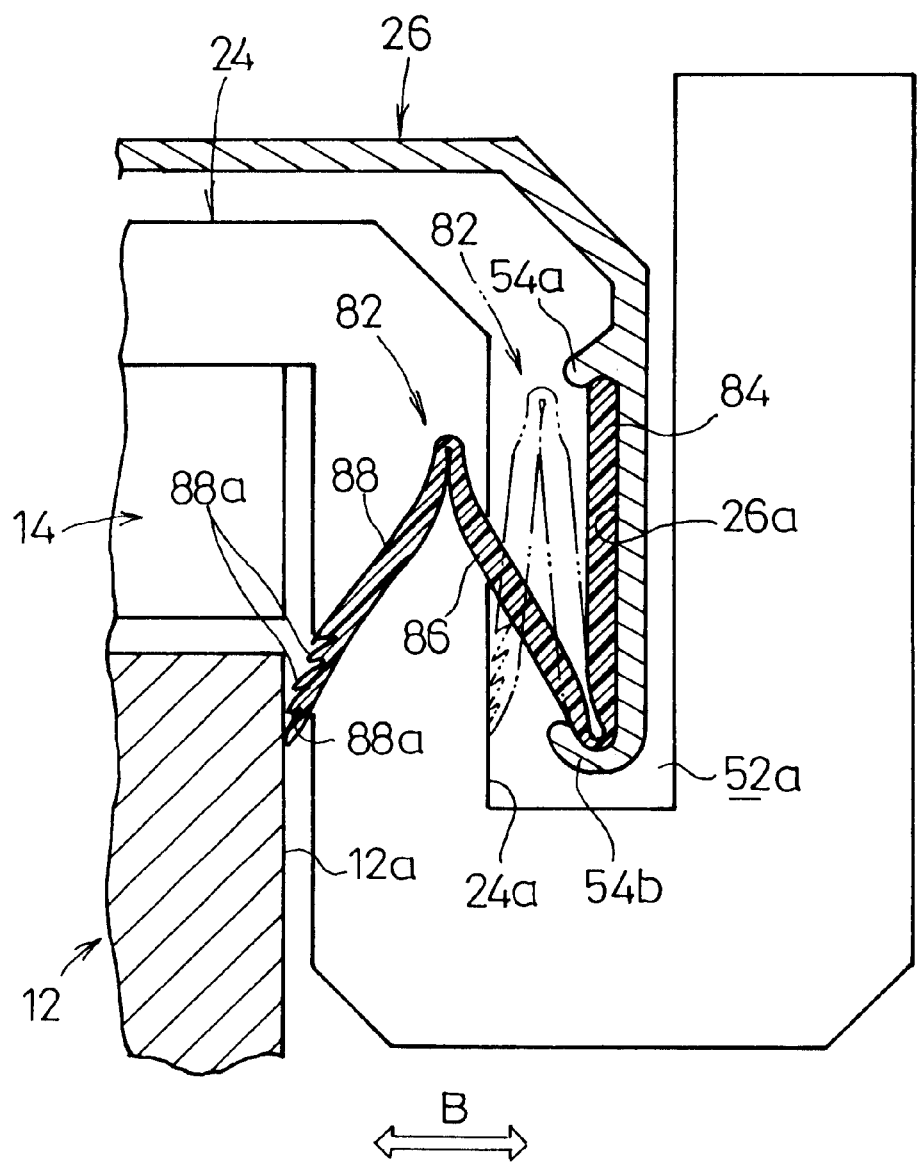
FIG. 7 shows a magnified vertical sectional view illustrating a dust-preventive member for constructing the rodless cylinder.

Next, a rodless cylinder 80 according to a second embodiment of the present invention is shown in FIGS. 5 to 7. The same constitutive components as those of the rodless cylinder 10 according to the first embodiment are designated by the same reference numerals, detailed explanation of which will be omitted.

The rodless cylinder 80 is provided with dust-preventive members 82. The dust-preventive member 82 is designed to have a bellows-shaped configuration obtained, for example, by folding a plate member made of rubber twice in the transfer direction (direction of the arrow A).

As shown in FIG. 7, the dust-preventive member 82 includes a fixed tab 84 which is arranged between projections 54a, 54b of the cover member 26, a swinging tab 86 which is swingable with respect to the fixed tab 84, and a sliding tab 88 which is provided swingably with respect to the swinging tab 86. A plurality of seal lips 88a are provided in the transfer direction on the sliding tab 88. An abrasion resistance treatment (coating) is applied to the surface of the sliding tab 88, if necessary.

As shown in FIG. 5, scrapers 89, which are inserted between the swinging tabs 86 and the sliding tabs 88 of the respective dust-preventive members 82 to remove the dust or the like, are secured to both ends in the movement direction of the attachment base 24. The scraper 89 is designed to have a triangular configuration corresponding to a shape of an opening which is formed by the swinging tab 86 and the sliding tab 88.

In the rodless cylinder 80 according to the second embodiment constructed as described above, the dust-preventive member 82 is capable of making elastic deformation in the direction of the arrow B perpendicular to (intersecting with) the direction of the arrow A which is the transfer direction. As shown in FIG. 7, the sliding tab 88 makes sliding contact with the side wall 12a of the cylinder tube 12 in an ordinary sealed state. On the other hand, when the attachment base 24 passes integrally with the slide table 14 which is the movable member, the sliding tab 88 makes elastic deformation toward the fixed tab 84 to make sliding contact with the side wall 24a of the attachment base 24 (see two-dot chain lines shown in FIG. 7).

Accordingly, the same effect as that of the first embodiment is obtained as follows. That is, for example, the dust-preventive member 82 does not affect the stroke of the rodless cylinder 80. It is possible to effectively shorten the entire length of the rodless cylinder 80. Further, the rodless cylinder 80 is advantageous as follows. That is, when the attachment base 24 is moved, the dust or the like can be reliably removed by the scraper 89 which is secured to the end of the attachment base 24, if the dust or the like is accumulated between the swinging tab 86 and the sliding tab 88 of the dust-preventive member 82.

Figure 8:
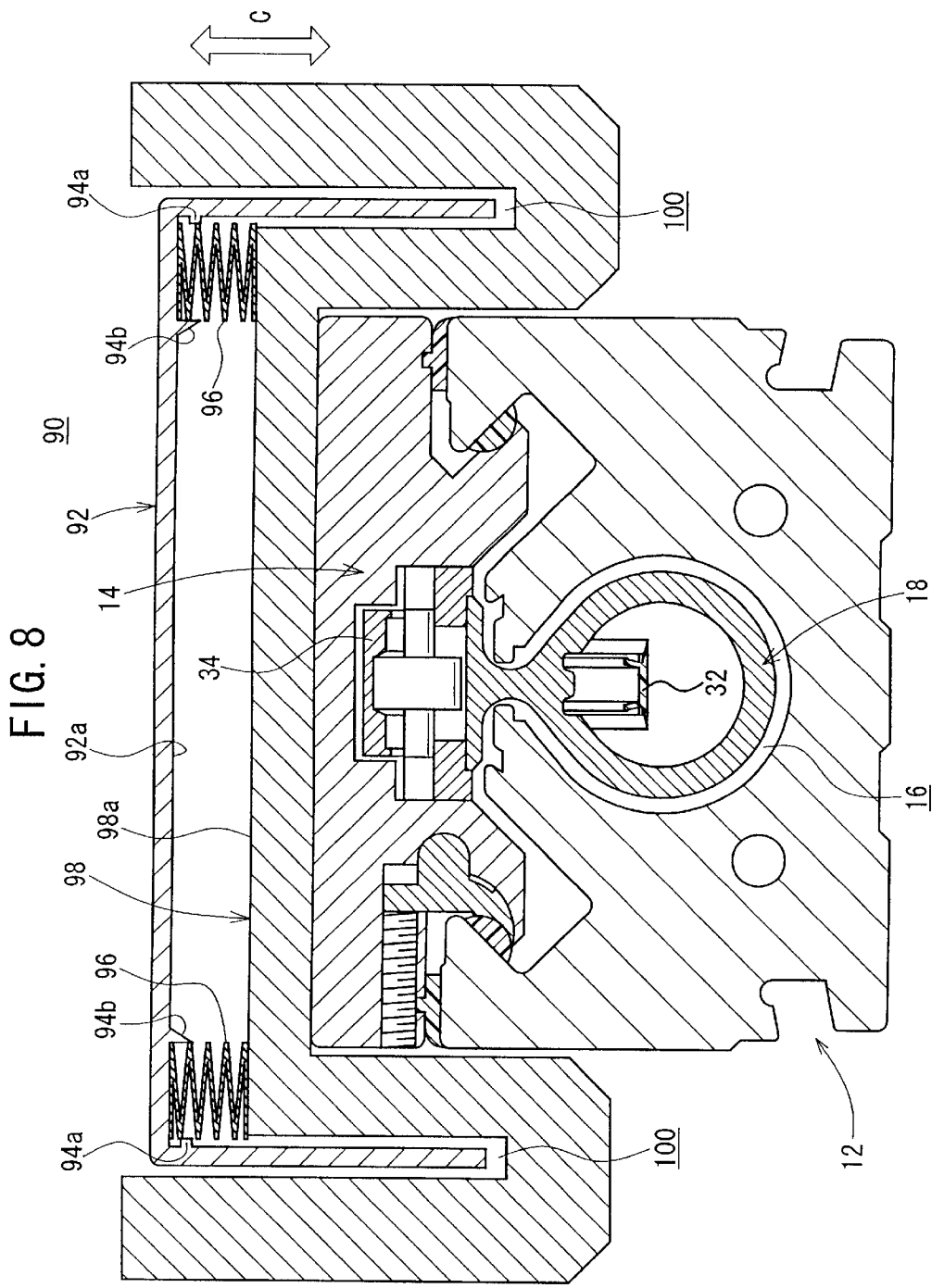
FIG. 8 shows a vertical sectional view illustrating a rodless cylinder including a slide table according to a third embodiment of the present invention.

Next, a rodless cylinder 90 according to a third embodiment of the present invention is shown in FIG. 8.

The rodless cylinder 90 is provided with a cover member 92 which is installed to the cylinder tube 12. Projections 94a, 94b, which extend in the longitudinal direction respectively, are provided on both sides of a ceiling side inner wall 92a of the cover member 92. The projections 94a, 94b support, in a fitting manner, first ends of dust-preventive members 96 each of which is designed to have a bellows-shaped configuration. The dust-preventive member 96 is constructed, for example, by folding a plate member made of rubber, for example, seven times. In an ordinary sealed state, the dust-preventive members 96 extend up to the lower ends of the both ends of the cover member 92 to avoid any invasion of the dust or the like into the cylinder tube 12.

An attachment base 98 is secured to the slide table 14. Both sides of the attachment base 98 are formed and bent to provide, at both ends, slit-shaped spaces 100 for accommodating the both ends of the cover member 92.

In this arrangement, in the case of the rodless cylinder 90, the dust-preventive member 96 is capable of making elastic deformation in the vertical direction, i.e., in the direction of the arrow C perpendicular to the longitudinal direction of the cylinder tube 12. The same effect as that obtained in the first and second embodiments is obtained. That is, for example, when the attachment base 98 passes, the bellows-shaped dust-preventive member 96 contacts with the upper surface 98a of the attachment base 98 to effect the reliable dust-preventive function.

Figure 9:
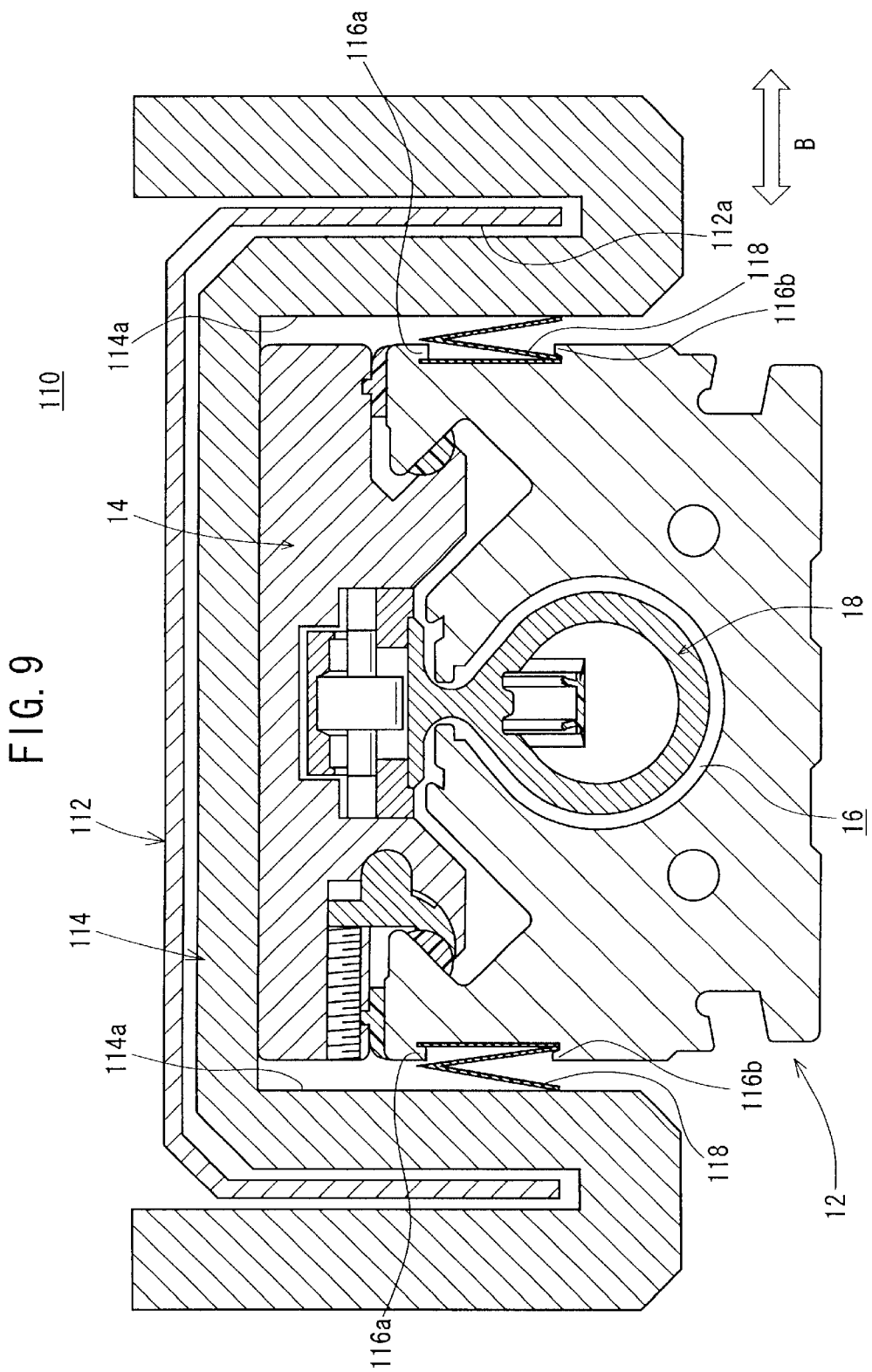
FIG. 9 shows a vertical sectional view illustrating a rodless cylinder including a slide table according to a fourth embodiment of the present invention.

A rodless cylinder 110 according to a fourth embodiment of the present invention is shown in FIG. 9.

The rodless cylinder 110 includes a cover member 112 which is installed to the cylinder tube 12, and an attachment base 114 which is secured to the slide table 14. Projections 116a, 116b are formed on the side wall 12a of the cylinder tube 12. A first end of a bellows-shaped dust-preventive member 118 is held by the projections 116a, 116b. A free end of the dust-preventive member 118 contacts with an inner wall 112a of the cover member 112 in an ordinary sealed stage. On the other hand, when the slide table 14 passes, the free end makes sliding contact with the inner wall 114a of the attachment base 114 to cause contraction in the direction of the arrow B. As described above, the dust-preventive member 118 is constructed to be elastically deformable in the direction of the arrow B.

Figure 10:
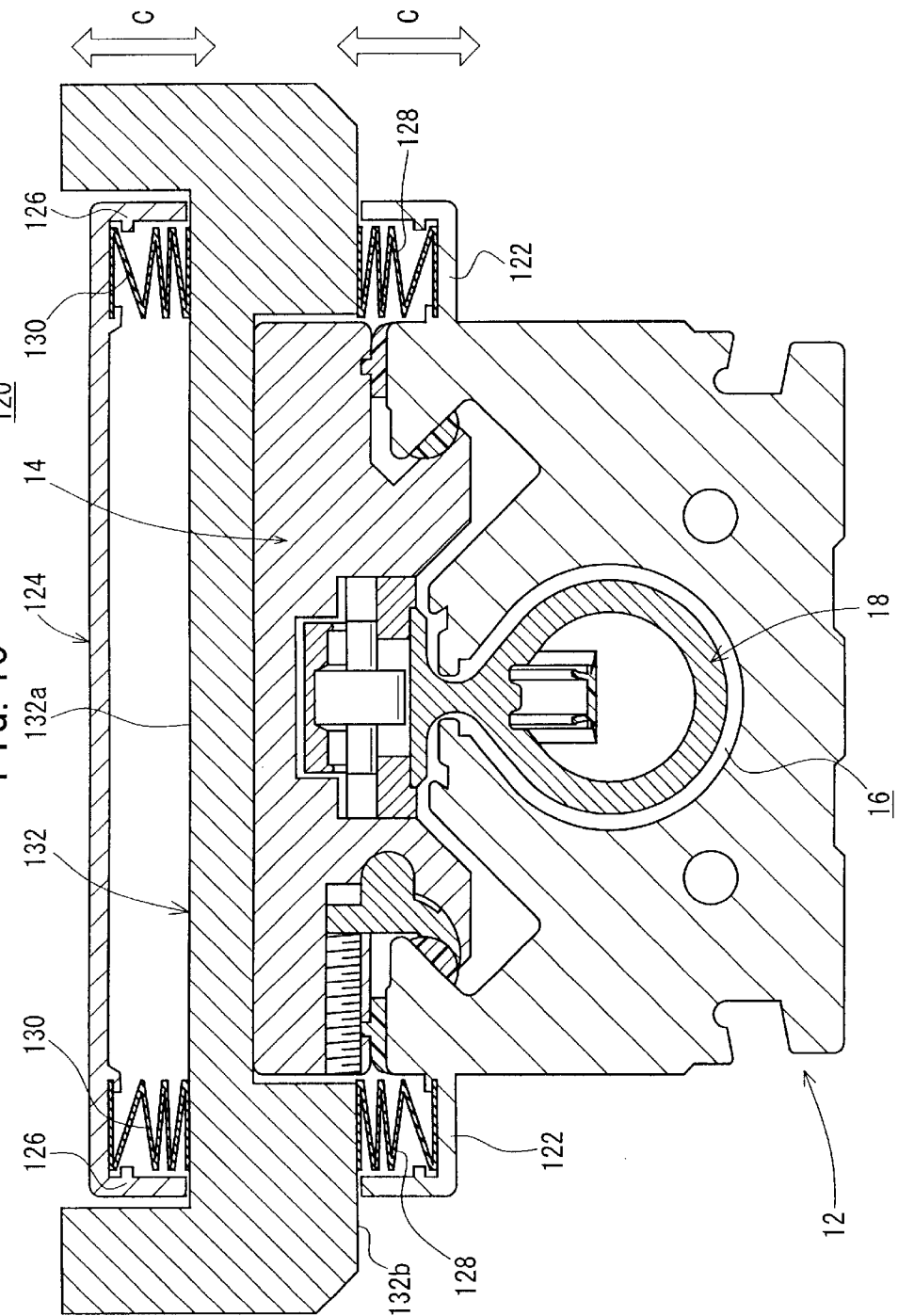
FIG. 10 shows a vertical sectional view illustrating a rodless cylinder including a slide table according to a fifth embodiment of the present invention.

A rodless cylinder 120 according to a fifth embodiment of the present invention is shown in FIG. 10.

In the rodless cylinder 120, receiving sections 122 are formed to expand outwardly at upper portions on both sides of the cylinder tube 12. Receiving sections 126 each including a pair of projections are provided opposingly to the receiving sections 122, for a cover member 124 which is secured to the cylinder tube 12.

First ends of bellows-shaped dust-preventive members 128, 130 are held by the receiving sections 122, 126. Free ends of the dust-preventive members 128, 130 make contact with each other, and thus an ordinary sealed state is maintained. An attachment base 132 is secured to the slide table 14. An upper surface 132a and a lower surface 132b of the attachment base 132 are constructed to make sliding contact with the free ends of the dust-preventive members 130, 128 provided elastically deformably in the direction of the arrow C.

Figure 11:
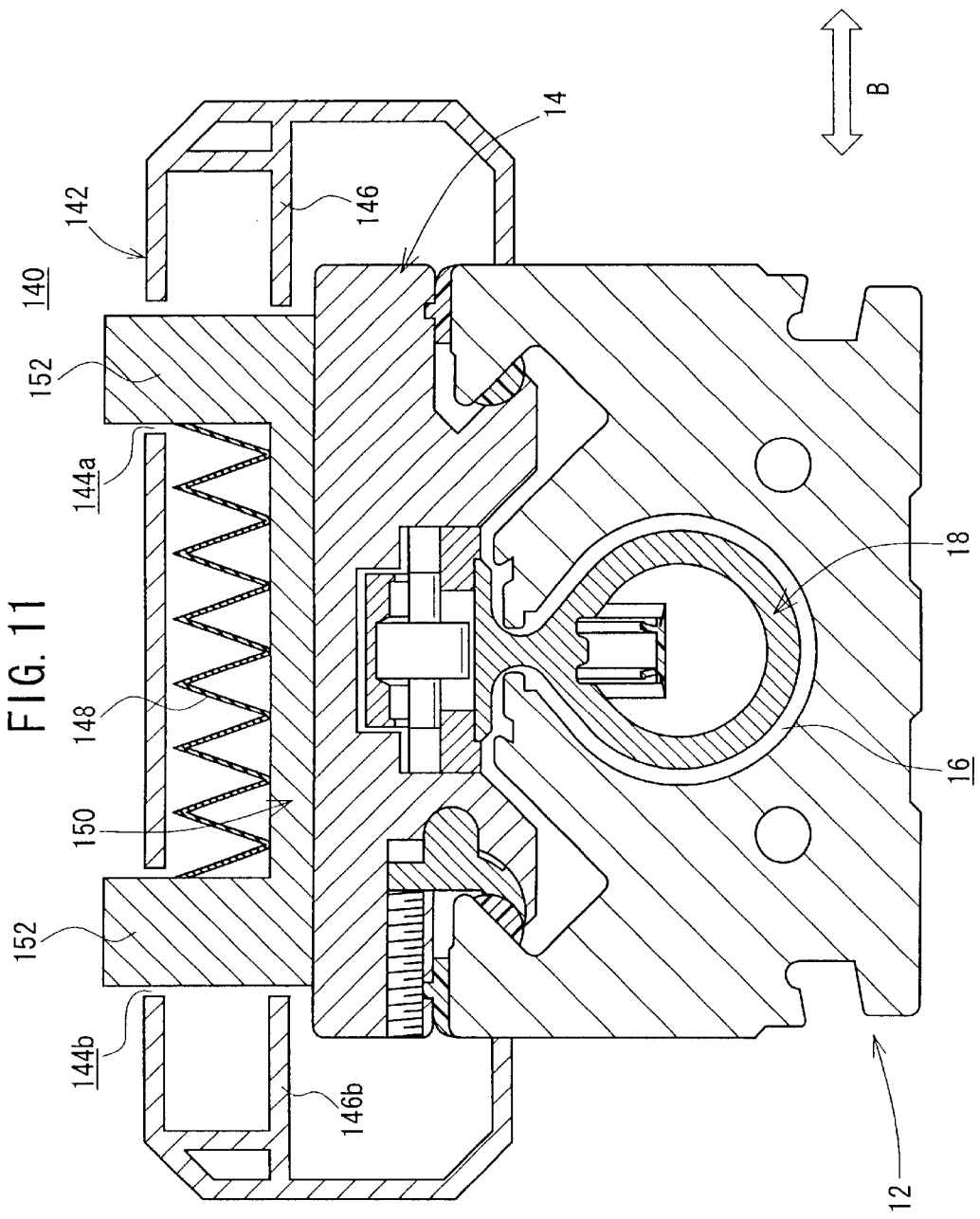
FIG. 11 shows a vertical sectional view illustrating a rodless cylinder including a slide table according to a sixth embodiment of the present invention.

A rodless cylinder 140 according to a sixth embodiment of the present invention is shown in FIG. 11.

The rodless cylinder 140 includes a cover member 142 which is secured to the cylinder tube 12. Openings 144a, 144b are formed in the transfer direction at upper portions of the cover member 142. Support plates 146a, 146b, which protrude in the direction of the arrow B, are integrally provided for the cover member 142. Both ends of a bellows-shaped dust-preventive member 148 are supported by the support plates 146a, 146b. The dust-preventive member 148 is constructed to be lengthy in the transfer direction, and it functions to avoid any invasion of the dust or the like from the openings 144a, 144b.

An attachment base 150 is secured to the slide table 14. The attachment base 150 is provided with expanded sections 152 which protrude upwardly from the openings 144a, 144b of the cover member 142. The dust-preventive member 148 is constructed such that it is contracted in the direction of the arrow B when the expanded sections 152 pass.

Figure 12:
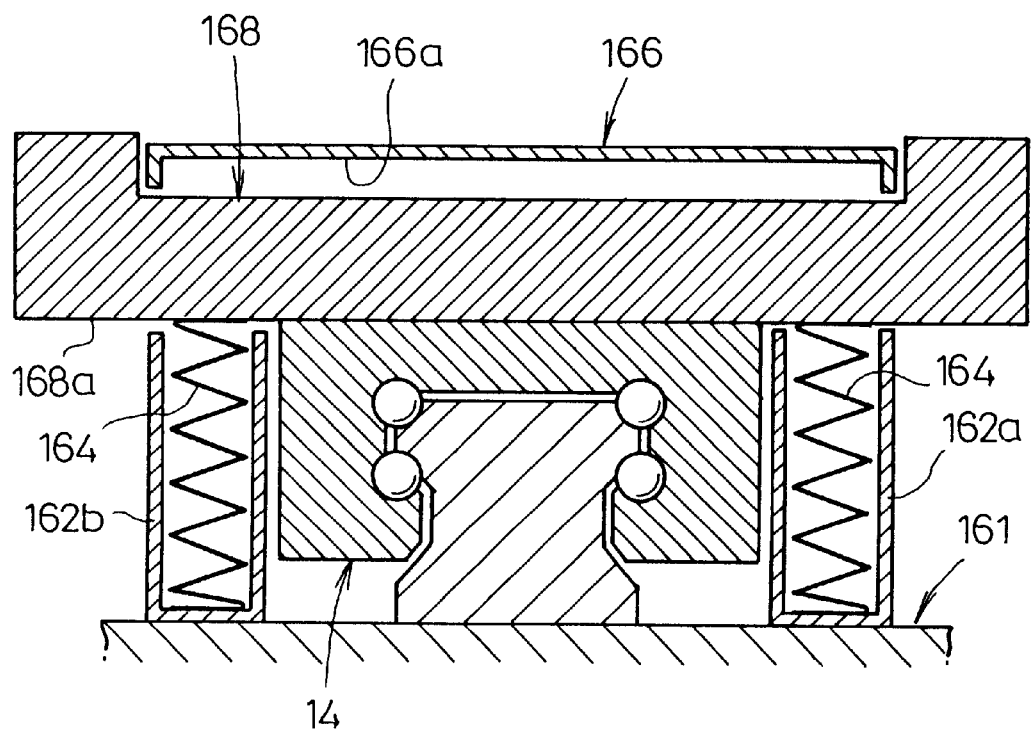
FIG. 12 shows a partial vertical sectional view illustrating a linear guide according to a seventh embodiment of the present invention.

A linear guide 160 according to a seventh embodiment of the present invention is shown in FIG. 12.

The linear guide 160 includes support sections 162a, 162b which are fixed in the transfer direction on a base pedestal 161. Ends of bellows-shaped dust-preventive members 164 are fixed to the support sections 162a, 162b.

In an ordinary sealed state, free ends of the dust-preventive members 164 make sliding contact with an inner wall 166a of a cover member 166 which is secured to the support sections 162a, 162b of the linear guide 160. On the other hand, when the slide table 14 is moved, the free ends of the dust-preventive members 164 make sliding contact with a lower surface 168a of an attachment base 168 which is moved integrally with the slide table 14. The dust-preventive members 164 are constructed to be capable of making elastic deformation in the vertical direction.

The bellows-shaped dust-preventive members 96, 118, 128, 148, 164 are used in the third to seventh embodiments respectively. However, in place of the bellows-shaped dust-preventive members 96, 118, 128, 148, 164, it is possible to use other dust-preventive members including the sponge rubber 56 described in the first embodiment.

Figure 13:
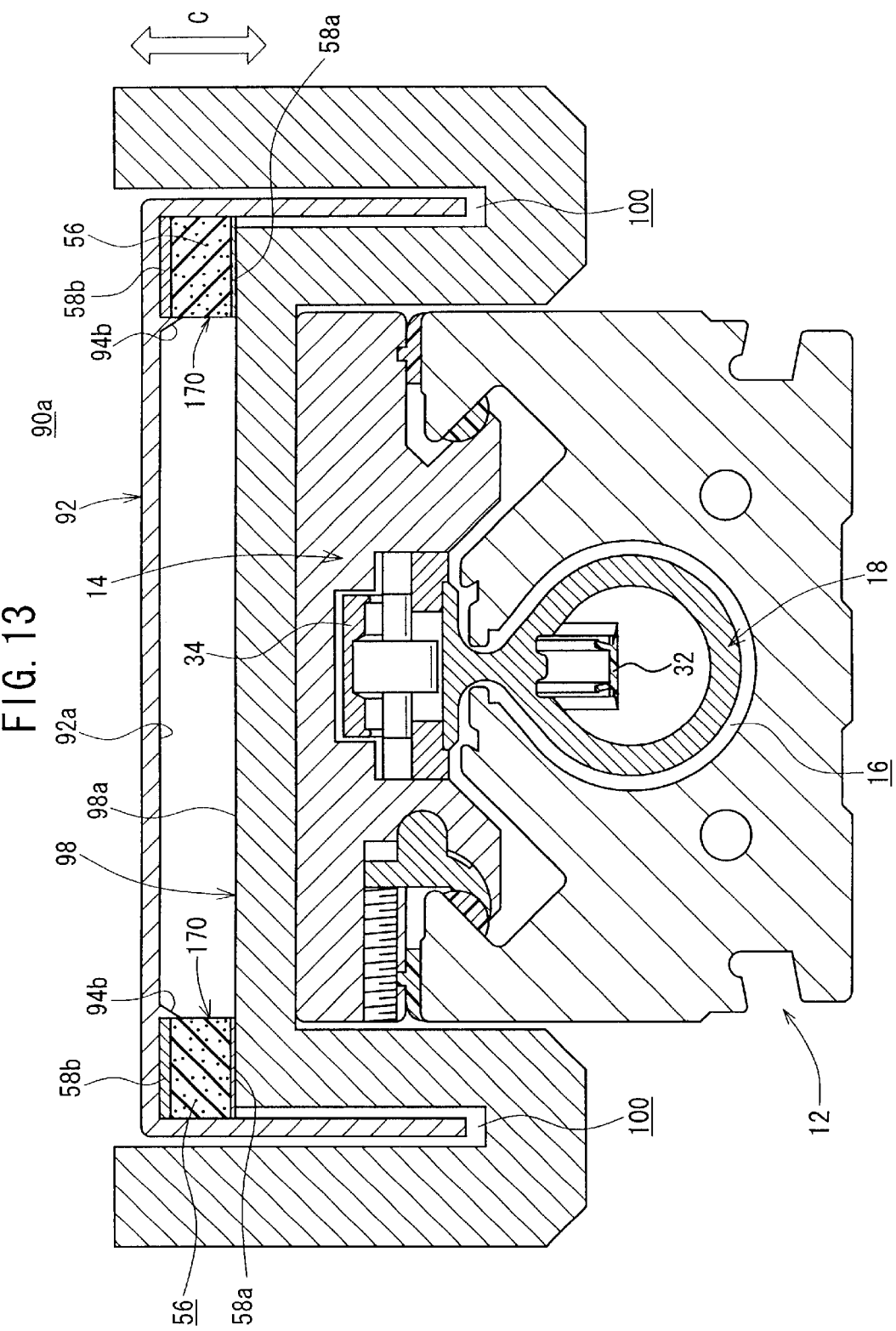
FIG. 13 shows a vertical sectional view illustrating a rodless cylinder including a slide table according to an eighth embodiment of the present invention.

For example, according to an eighth embodiment of the present invention shown in FIG. 13, a dust-preventive member 170 having a sponge rubber 56 interposed between plate members 58a, 58b made of stainless steel is provided between the ceiling side inner wall 92a of the cover member 92 and the upper surface 98a of the attachment base 98 secured to the movable member 14. Since the plate member 58a made of stainless steel is secured to the bottom portion of the sponge rubber 56, the sponge rubber 56 is prevented from being damaged by diffusion of sputters.

Figure 14:
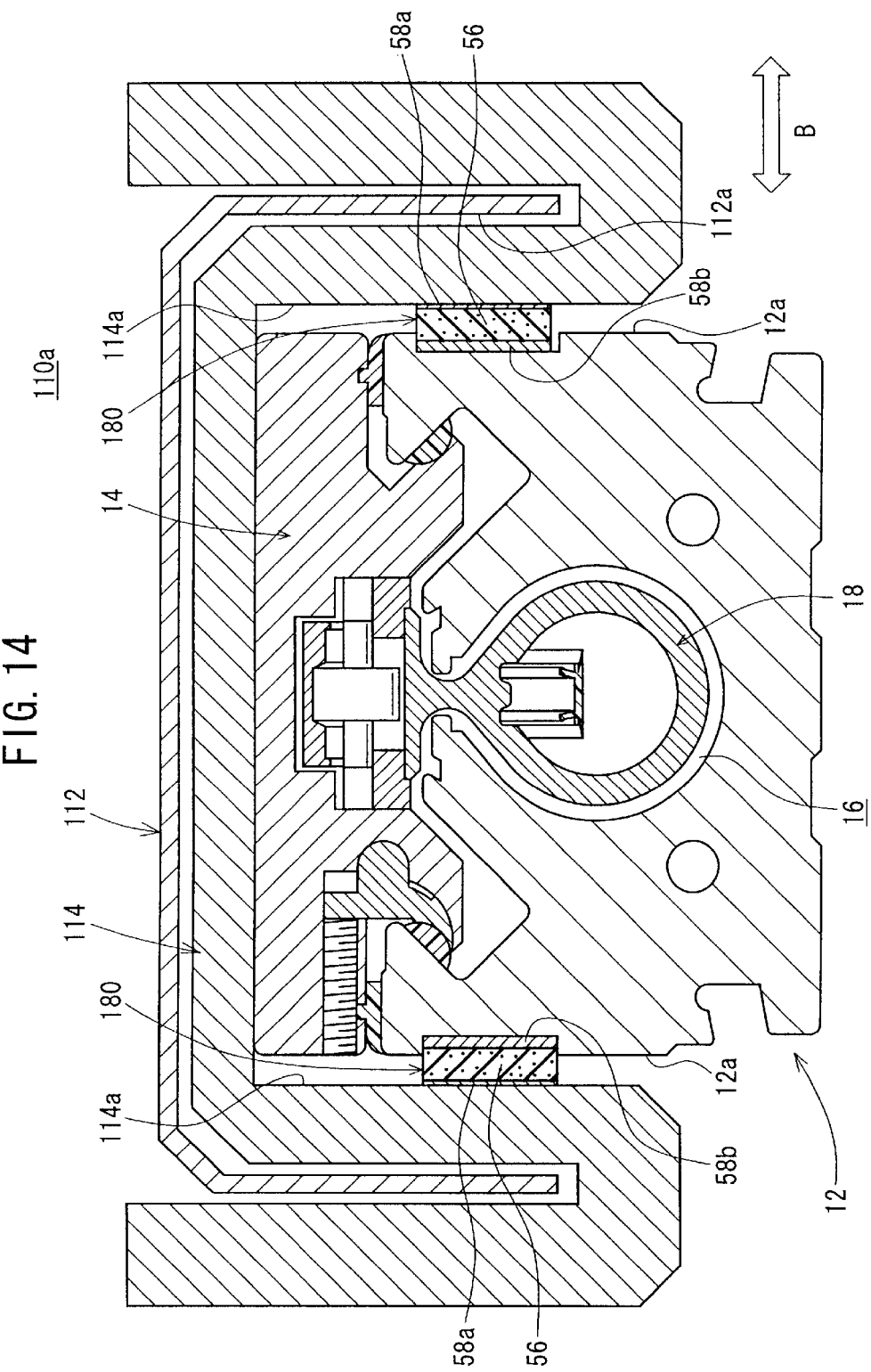
FIG. 14 shows a vertical sectional view illustrating a rodless cylinder including a slide table according to a ninth embodiment of the present invention.

Further, according to the ninth embodiment of the present invention shown in FIG. 14, a dust-preventive member 180 is arranged between the side wall 12a of the cylinder tube 12 and the inner wall 112a of the cover member 112, and it makes sliding contact with the inner wall 114a of the attachment base 114 to cause contraction when the slide table 14 passes.

Figure 15:
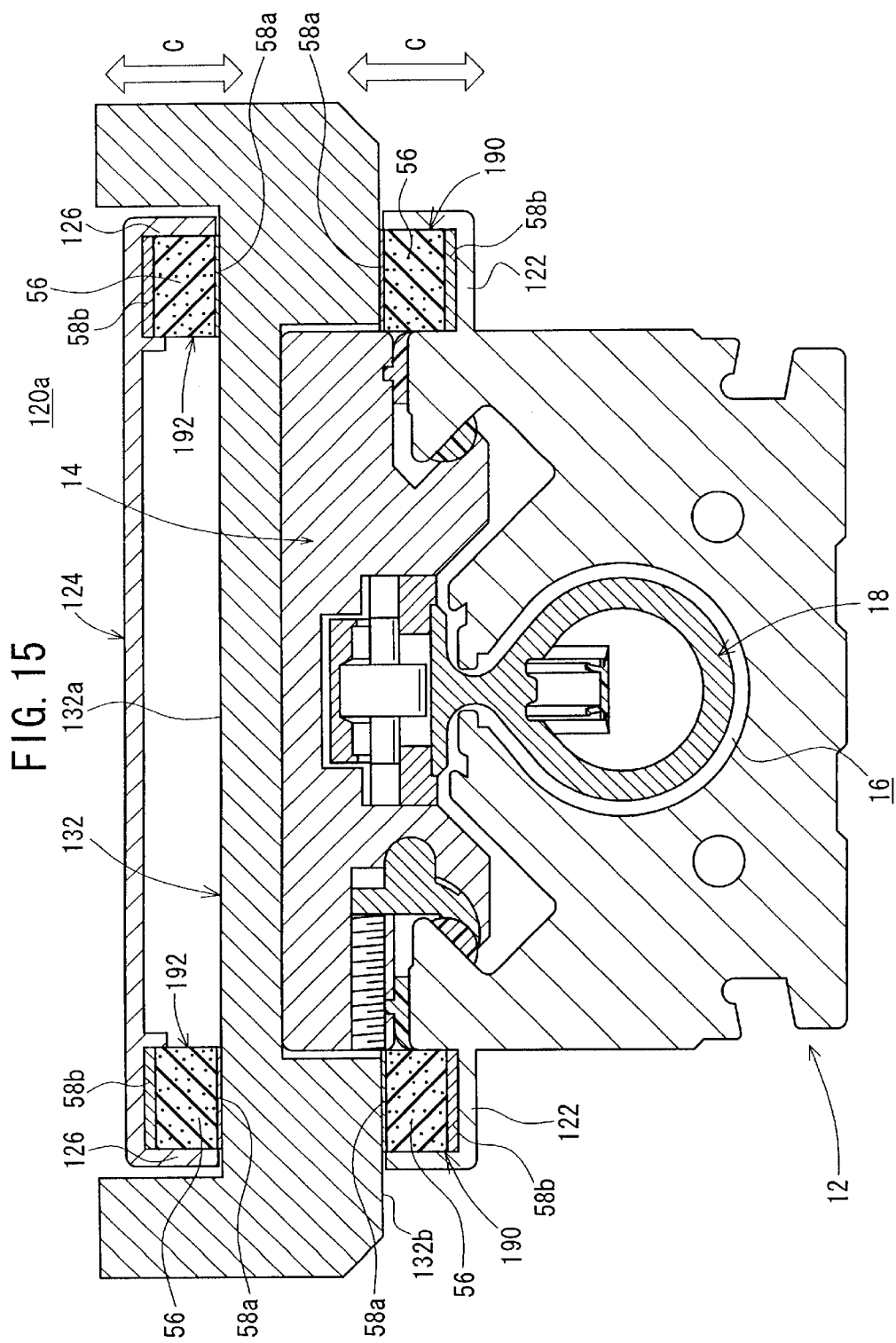
FIG. 15 shows a vertical sectional view illustrating a rodless cylinder including a slide table according to a tenth embodiment of the present invention.

Furthermore, according to the tenth embodiment of the present invention shown in FIG. 15, there is provided a pair of dust-preventive members 190, 192. The pair of dust-preventive members 190, 192 are held by the first receiving section 122 on the cylinder tube 12 side and the second receiving section 126 on the cover member 124 side respectively. The first receiving section 122 and second receiving section 126 are opposed with each other.

Figure 16:
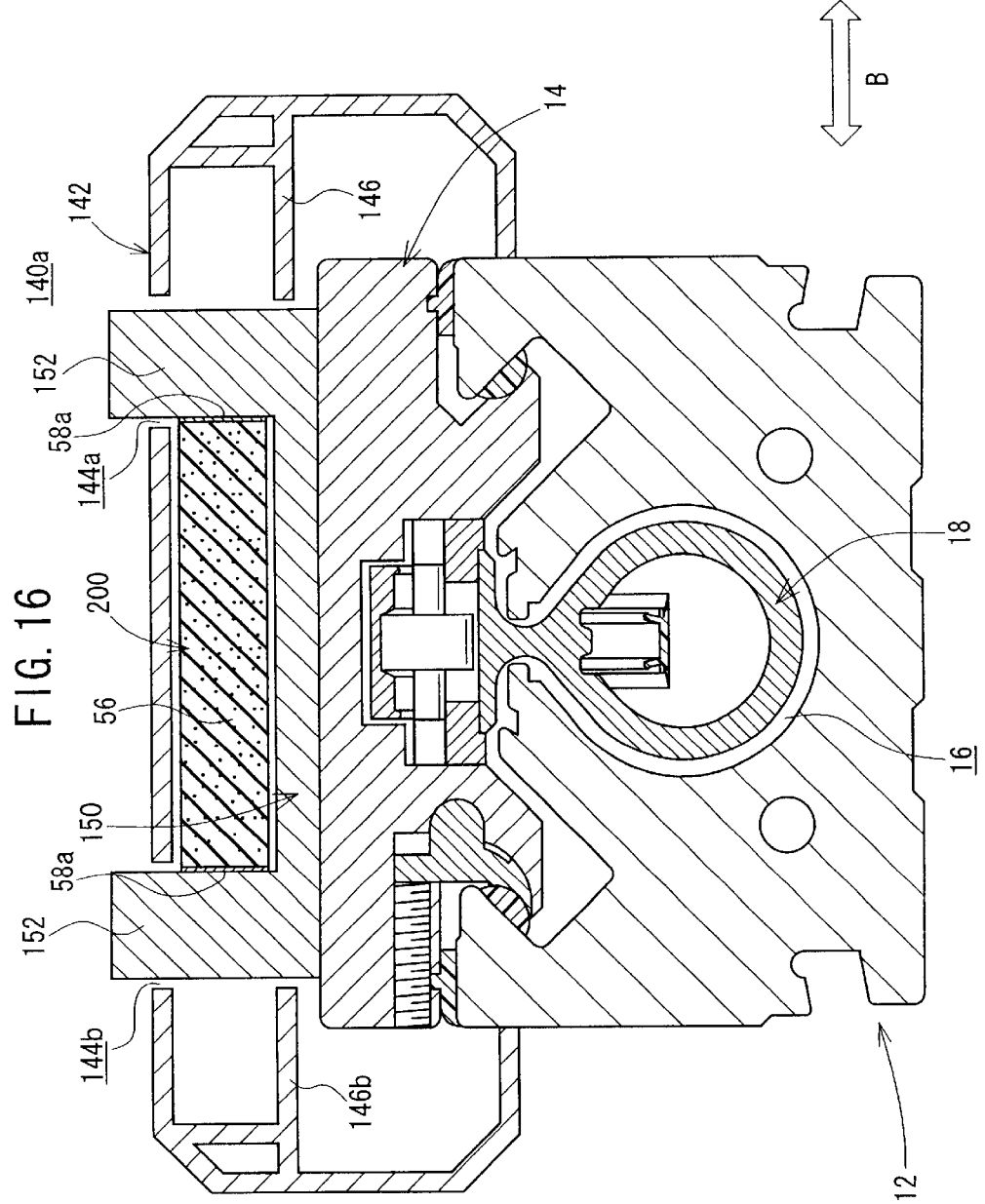
FIG. 16 shows a vertical sectional view illustrating a rodless cylinder including a slide table according to an eleventh embodiment of the present invention.

Furthermore, according to the eleventh embodiment of the present invention shown in FIG. 16, there is provided a dust-preventive member 200, both ends of which are supported by a pair of support plates 146a, 146b which protrude in a direction of arrow the B substantially perpendicular to the transfer direction (direction of the arrow A), and which makes sliding contact with expanded sections 152 of an attachment base 150 to cause contraction when the slide table 14 passes.

The first to eleventh embodiments have been explained by using, as the transfer apparatus, the rodless cylinders 10, 80, 90, 90a, 110, 110a, 120, 120a, 140 and 140a and the linear guide 160. Alternatively, the present invention is applicable, for example, to a transfer apparatus which constitutes various actuators such as ball screws.

What is claimed is:

1. A transfer apparatus comprising:
 a main apparatus body having a longitudinal dimension in a transfer direction of a workpiece, said main apparatus body containing an actuator;
 a movable member connected to said actuator via a transmitting section, said movable member being movable back and forth in said transfer direction with respect to said main apparatus body in accordance with an action of said actuator while holding said workpiece; and
 a dust-preventive member, said dust-preventive member being held stationary in said transfer direction and being elastically deformable in a direction transverse to said transfer direction when said movable member moves in said transfer direction while sliding against said dust-preventive member.

2. The transfer apparatus according to claim 1, wherein said dust-preventive member is composed of a sponge rubber.

3. The transfer apparatus according to claim 1, further comprising a cover member installed on said main apparatus body covering said movable member, wherein said dust-preventive member is held along at least an inner wall of said cover member.

4. The transfer apparatus according to claim 3, wherein said dust-preventive member is composed of a sponge rubber.

5. The transfer apparatus according to claim 4, wherein said sponge rubber is provided with a sliding member which is formed integrally on a side of a surface to make sliding contact with said movable member.

6. The transfer apparatus according to claim 5, wherein said sliding member is made of stainless steel.

7. The transfer apparatus according to claim 4, wherein said movable member includes an attachment base attached thereto and said dust-preventive member is interposed between an inner wall of said cover member, a side wall of said main apparatus body, and a side wall of said attachment base.

8. The transfer apparatus according to claim 4, wherein said movable member includes an attachment base attached thereto and said dust-preventive member is provided between a ceiling side inner wall of said cover member and an upper surface of said attachment base.

9. The transfer apparatus according to claim 4, wherein said movable member includes an attachment base attached thereto and said dust-preventive member is arranged between a side wall of said main apparatus body and an inner wall of said cover member, and said dust-preventive member makes sliding contact with an inner wall of said attachment base, said dust-preventive member contracting when said movable member passes.

10. The transfer apparatus according to claim 4, wherein a first receiving section, which expands outwardly, is formed at an upper portion on each of both sides of said movable member, a second receiving section, which is opposed to said first receiving section, is formed on an inner wall of said cover member, and first ends of a pair of dust-preventive members are held by said first receiving section and said second receiving section respectively.

11. The transfer apparatus according to claim 4, wherein said cover member comprises a pair of support plates which protrude in a direction substantially perpendicular to said transfer direction, for supporting respective ends of said dust-preventive member.

12. The transfer apparatus according to claim 3, wherein said dust-preventive member comprises a plate member folded in a bellows-shaped configuration and extending in said transfer direction.

13. The transfer apparatus according to claim 12, wherein said movable member includes an attachment base attached thereto and said dust-preventive member includes a scraper corresponding to said bellows-shaped configuration and installed to said attachment base.

14. The transfer apparatus according to claim 12, wherein said movable member includes an attachment base attached thereto and said dust-preventive member is interposed between an inner wall of said cover member, a side wall of said main apparatus body, and a side wall of said attachment base.

15. The transfer apparatus according to claim 12, wherein said dust-preventive member has a fixed tab which is installed between projections of said cover member, a swinging tab which is swingable with respect to said fixed tab, and a sliding tab which is provided swingably with respect to said swinging tab.

16. The transfer apparatus according to claim 12, wherein said movable member includes an attachment base attached thereto and said dust-preventive member is provided between a ceiling side inner wall of said cover member and an upper surface of said attachment base.

17. The transfer apparatus according to claim 12, wherein said movable member includes an attachment base attached thereto and said dust-preventive member is arranged between a side wall of said main apparatus body and an inner wall of said cover member, and said dust-preventive member makes sliding contact with an inner wall of said attachment base, said dust-preventive member contracting when said movable member passes.

18. The transfer apparatus according to claim 12, wherein a first receiving section, which expands outwardly, is formed at an upper portion on each of both sides of said movable member, a second receiving section, which is opposed to said first receiving section, is formed on an inner wall of said cover member, and first ends of a pair of dust-preventive members are held by said first receiving section and said second receiving section respectively.

19. The transfer apparatus according to claim 12, wherein said cover member comprises a pair of support plates which protrude in a direction substantially perpendicular to said transfer direction, for supporting respective ends of said dust-preventive member.

20. The transfer apparatus according to claim 1, wherein said transfer apparatus is a rodless cylinder, said rodless cylinder comprising:

said apparatus body comprising a cylinder tube;

said movable member comprising a slide table;

said actuator comprising a piston which makes reciprocating movement in a bore defined in said cylinder tube;

said transmitting section which connects said piston and said slide table to one another via a slit formed in said cylinder tube and extending along said longitudinal dimension in said transfer direction; and a cover member covering said slide table and installed to said cylinder tube to extend in said longitudinal dimension.

* * * * *